United States Patent
Reid

[15] 3,658,176
[45] Apr. 25, 1972

[54] COMPACT NESTING SEPTIC TANK PACKAGE AND SEWAGE DISPOSAL SYSTEM UTILIZING SAME

[72] Inventor: Edward S. Reid, Hartsville, S.C.

[73] Assignee: Sonoco Products Company, Hartsville, S.C.

[22] Filed: Apr. 7, 1970

[21] Appl. No.: 26,321

[52] U.S. Cl. ............................206/65 K, 206/46 H, 210/208, 220/5 A
[51] Int. Cl. .......................................B65d 7/02, B65d 85/62
[58] Field of Search.....................206/65 K, 65 R, 65 B, 46 H, 206/47 R; 220/5 A; 210/208, 232

[56] References Cited

UNITED STATES PATENTS

| | | | |
|---|---|---|---|
| 2,553,885 | 5/1951 | Van Orman et al. | 206/65 R |
| 3,469,730 | 9/1969 | Neff et al. | 220/5 A |
| 2,860,772 | 11/1958 | Northington, Jr. et al. | 206/65 B |
| 3,195,723 | 7/1965 | MacDonnell et al. | 206/65 B |

Primary Examiner—William T. Dixson, Jr.
Attorney—Parrott, Bell, Seltzer, Park & Gibson

[57] ABSTRACT

A compact nesting septic tank package comprising a plurality of prefabricated elongate septic tanks having one open end and successively diminishing cross-sectional areas with the tanks being successively and removably positioned one within the other. The inner septic tank preferably has a plurality of conduits positioned therein in a nesting package arrangement for use in forming sewage conduits. A sewage disposal system may be formed from the package comprising vertically extending, tandemly arranged septic tanks of diminishing cross-sectional areas to provide the desired capacity. The septic tanks include closures at the upper ends and are closed at the lower ends by being mounted on a base member. The system includes conduits interconnecting the septic tanks and arranged for conveying sewage from a source to the tanks, between the tanks and to an absorption field. Preferably, the conduits are so disposed for conveying the sewage throughout the absorption field.

7 Claims, 4 Drawing Figures

Patented April 25, 1972
3,658,176
2 Sheets-Sheet 1
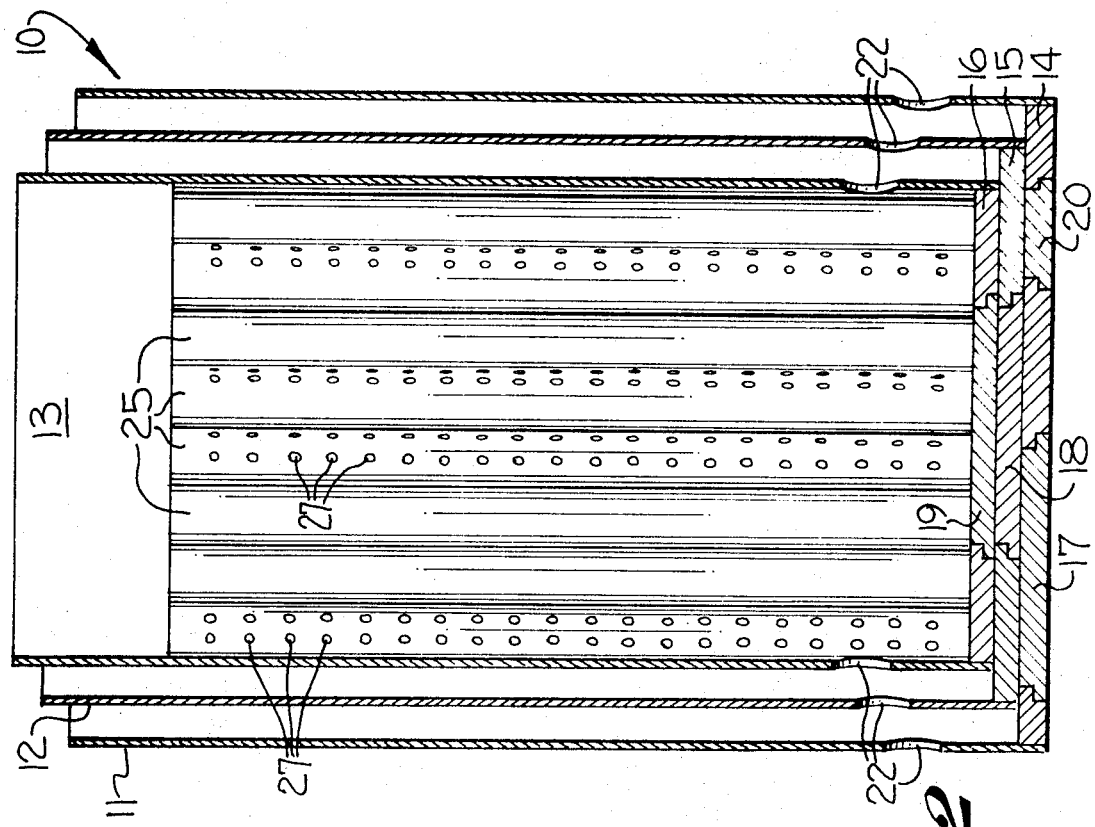
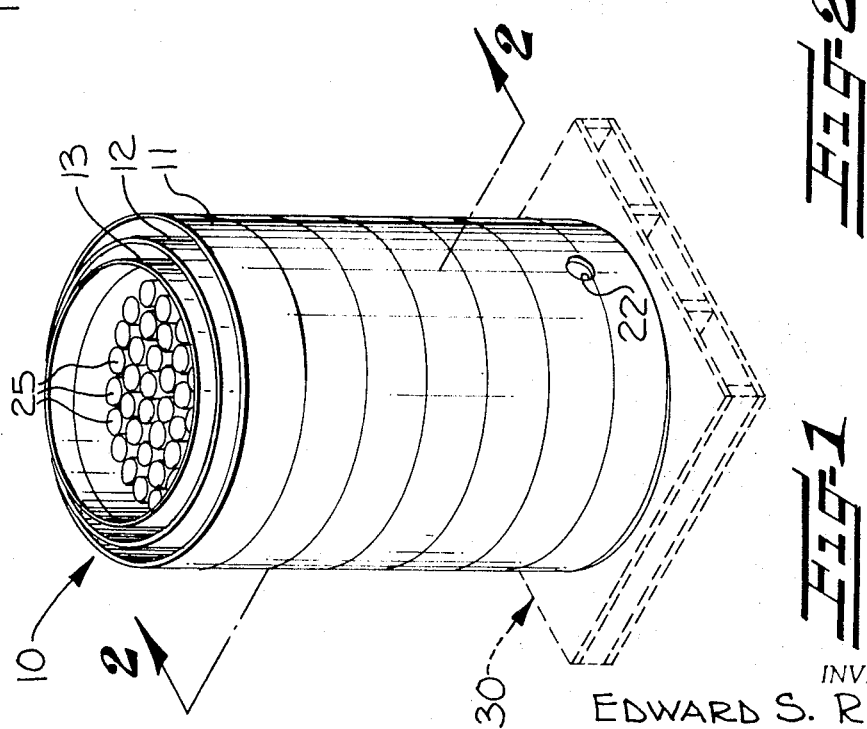
INVENTOR:
EDWARD S. REID
BY Parrott, Bell, Seltzer, Park & Gibson
ATTORNEYS Patented April 25, 1972
3,658,176
2 Sheets-Sheet 2
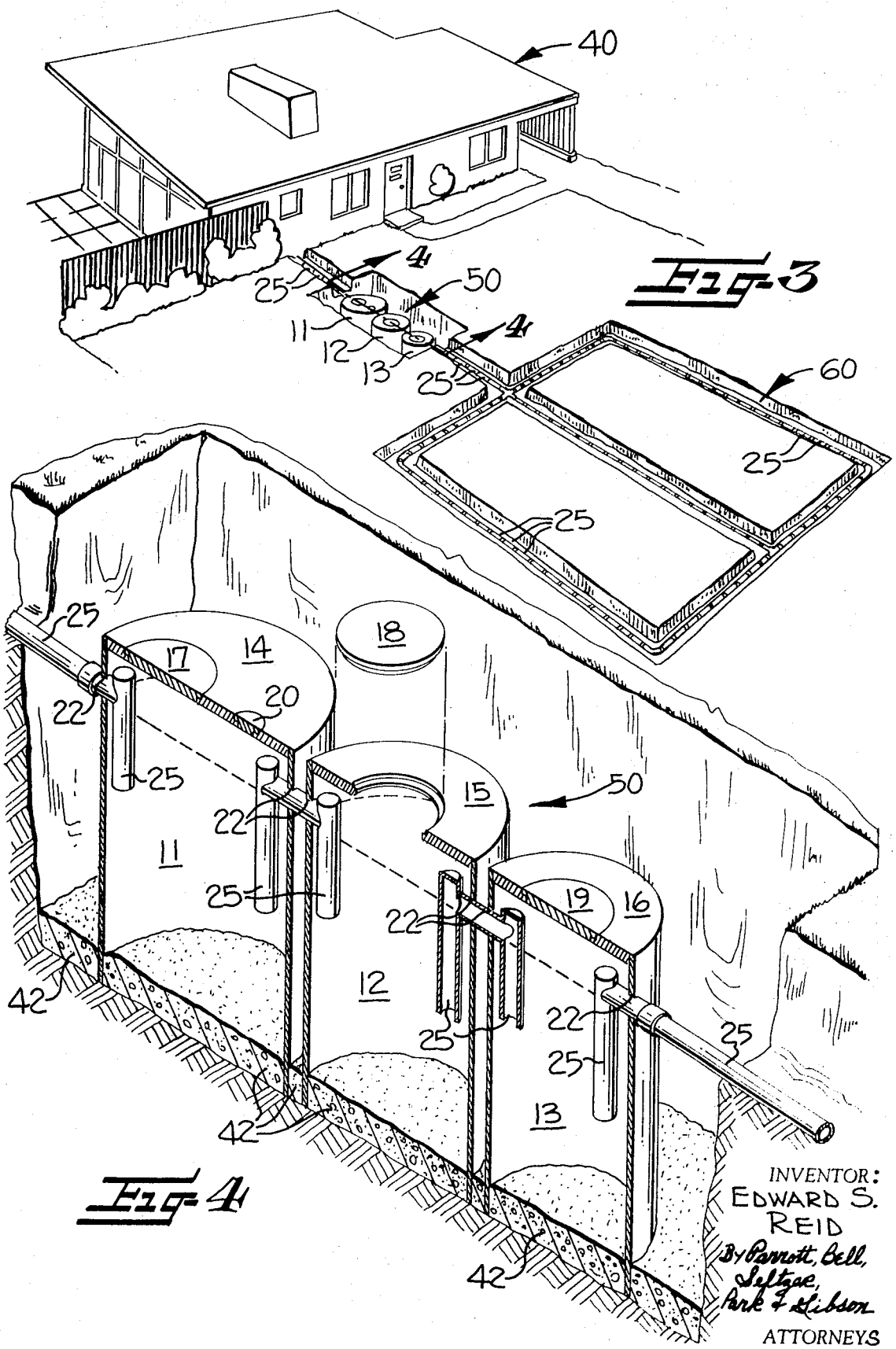
INVENTOR:
EDWARD S.
REID
By Parrott, Bell,
Seltzer,
Park & Gibson
ATTORNEYS

COMPACT NESTING SEPTIC TANK PACKAGE AND SEWAGE DISPOSAL SYSTEM UTILIZING SAME

This invention relates to a nesting septic tank package and sewage disposal system utilizing same, the components of which may be prefabricated, packaged in a compact manner, easily shipped and assembled into a sewage disposal system at the installation site to provide a relatively low cost sewage disposal system.

Sewage disposal systems utilizing septic tanks have conventionally been employed for individual dwelling units where sewage service from an acceptable public, private or community sewage disposal system is not readily available. Such a sewage disposal system typically includes a septic tank system to which sewage is conveyed from the dwelling unit and having an adequate capacity for sewage settling, and sludge and scum storage. After treatment of the sewage in the septic tank system, the treated sewage is typically conveyed to an absorption field, bed, pit or the like for dissipation thereby.

In the case of an individual dwelling unit, the required capacity for the septic tank system is normally dependent upon the number of persons habitating the dwelling unit, as reflected by the number of bedrooms in the dwelling unit. For instance, the U.S. Government has set minimum capacities for septic tank systems in order to meet Federal Housing Authority requirements. In a dwelling unit having two or less bedrooms the septic tank system must have a capacity of at least 750 gallons; whereas, in a dwelling unit having four bedrooms the septic tank system must have a minimum capacity of 1,000 gallons. For each bedroom in excess of four, an additional capacity of 250 gallons is required.

In providing structurally sound septic tank systems having these capacities, it has been conventional to fabricate a single septic tank having the required capacity from cement or similar materials. Due to the size and weight of such a septic tank, prefabrication thereof has been highly impractical as a result of the extensive problems presented in handling, shipping and installation of same. Accordingly, it has been conventional to fabricate the septic tank at the installation site in the installed position so that size and weight thereof do not present problems. However, fabrication in this manner has been found to be relatively expensive in view of the manpower, time, equipment and the like utilized.

With the foregoing in mind, it is an object of the present invention to provide a prefabricated nesting septic tank package characterized by compactness, ease in shipping and assembly in a sewage disposal system.

Another object of the present invention is to provide a sewage disposal system utilizing such a prefabricated, compact nesting septic tank package.

Briefly, the objects of the present invention are accomplished by providing a nesting septic tank package comprising a plurality of prefabricated elongate septic tanks, which may be formed from a relatively inexpensive, lightweight, commercially available material, being open at one end and having successively diminishing transverse cross-sectional areas. The septic tanks are successively and removably positioned one within the other to form a compact package for easy shipment thereof to the installation site. A plurality of conduits are preferably positioned within the inner septic tank of the smallest cross-sectional area in a nesting package arrangement for use in forming sewage conduits to convey sewage from a source to the tanks, between the tanks and to an absorption field.

A sewage disposal system formed from the nesting septic tank package includes horizontally disposed base means, a plurality of elongate, vertically extending, tandemly arranged septic tanks having successively diminishing cross-sectional areas for providing the desired capacity. The tanks have means forming closures at the upper ends thereof and are mounted at the lower ends thereof on the base means with the base means closing the lower ends thereof, and conduit means interconnecting the septic tanks and arranged for conveying sewage from a source to the septic tanks, between the tanks and to an absorption field. A sufficient additional number of conduits may be positioned within the inner septic tank in a nesting package arrangement for use in forming sewage conduits in the disposal system to convey sewage throughout the absorption field.

Some of the objects of the invention having been stated, other objects will appear as the description proceeds when taken in connection with the accompanying drawings, in which:

FIG. 1 is a perspective view of a nesting septic tank package of the present invention;

FIG. 2 is an enlarged sectional view taken substantially along the line 2—2 of FIG. 1;

FIG. 3 is a perspective view of a sewage disposal system utilizing the nesting septic tank package of FIGS. 1 and 2; and FIG. 4 is an enlarged sectional view taken substantially along the line 4—4 of FIG. 3.

Referring in particular to FIGS. 1 and 2, there is illustrated a nesting septic tank package, generally indicated at 10, of the present invention to be utilized in a sewage disposal system as illustrated in FIGS. 3 and 4. With reference first to FIGS. 1 and 2, the nesting septic tank package 10 includes a plurality of three elongate septic tanks 11, 12 and 13. The septic tanks 11, 12 and 13 are preferably of substantially uniform cross-sectional area throughout the lengths thereof and have successively diminishing cross-sectional areas. In the present embodiment, the septic tanks 11, 12 and 13 are cylindrical, of substantially the same length and each has one end open. Thus, the septic tanks 11, 12 and 13 may be successively and removably positioned one within the other, as illustrated in FIGS. 1 and 2, to form a compact or nesting septic tank package 10.

With reference to FIG. 2, the ends of the septic tanks 11, 12 and 13 opposed to the open ends are closed by end walls 14, 15 and 16, respectively, and may include removable means in the form of removable manhole covers 17, 18 and 19, respectively, which are threadably received in threaded apertures in end walls 14, 15 and 16, respectively, for providing access to the interior of the septic tanks 11, 12 and 13. The end wall 14 of the largest septic tank 11, in addition, includes a relatively small removable cover 20 which also is threadably received in a threaded aperture in end wall 14 and provides an inspection opening. As best illustrated in FIG. 2, each of the septic tanks 11, 12 and 13 preferably includes diametrically opposed openings 22, the reasons for which will be hereinafter explained.

By having the septic tanks 11, 12 and 13 so constructed and arranged, the additive or total capacity of the septic tanks 11, 12 and 13 is substantially more than that of the largest septic tank 11. For instance, three cylindrical septic tanks of about 6 feet in length and having inside diameters of 48 inches, 42 inches and 36 inches, respectively, provide a total capacity in excess of 1,000 gallons and thus, upon proper interconnection in a sewage disposal system, will accommodate a four bedroom dwelling unit. If a larger capacity is desired, the size or number of tanks may be increased. When such septic tanks are successively and removably positioned one within the other, as illustrated in FIGS. 1 and 2, the nesting septic tanks consume a space approximating that of the 48-inch diameter tank and, thus, provide a compact septic tank package for ease in shipment thereof to the sewage disposal system installation site.

While the septic tanks 11, 12 and 13 may be formed from many and varied materials including metal, plastic and the like, it has been found advantageous from a weight and expense standpoint to use prefabricated sewage impervious fibrous tubes such as bituminized fibrous tubes commercially sold by Sonoco Products Company of Hartsville, S.C., under the trademark "DUROPIPE". These tubes are typically formed from a multi-ply, spirally or convolutely wound paper product which has been impregnated with a thermoplastic water or sewage impervious composition, such as coal tar pitch. For a more complete description of such tubes, reference is made to U.S. Pat. No. 2,478,181.

The septic tank 13 of the smallest transverse cross-sectional area or diameter, as in the present embodiment, includes a plurality of conduits 25 positioned therein a nesting package arrangement for use in forming sewage conduits in the disposal system to convey sewage from a source such as a dwelling unit to the tanks, between the tanks and to an absorption field for dissipation of the sewage after treatment thereof in the septic tanks. Additional conduits 25 may be positioned in the septic tank for use in forming sewage conduits in the disposal system to convey sewage throughout an absorption field for dissipation of sewage treated by the septic tanks 11, 12 and 13. With reference to FIG. 2, these additional conduits 25 have perforations 27 disposed longitudinally and circumferentially thereof. Upon interconnecting conduits 25 by conventional coupling means (not shown), sewage conduits may be provided to convey sewage from the septic tanks throughout an absorption field which sewage will be dissipated through the perforations therein and absorbed by the ground adjacent thereto.

The conduits 25 are preferably cylindrical tubes and may be formed from the same material as the septic tanks 11, 12 and 13. Where the inner septic tank 13 is cylindrical and has an inside diameter of 36 inches and is approximately 6 feet in length, it has been found that approximately 50 four-inch tubes having a length of about 5 or 6 feet may be disposed in side-by-side, parallel relation longitudinally within septic tank 13 to provide a sufficient size and number of conduits 25 for use in forming sewage conduits in the disposal system to convey sewage from a source to the tanks, between the tanks, and to and throughout an absorption field.

While the compactness and relatively light weight of the nesting septic tank package 10 of the present invention provides easy handling and shipment thereof, the nesting septic tank package 10 may, as illustrated in FIG. 1, be positioned upon a pallet, generally indicated at 30, and handled by conventional lifting means to further facilitate easy handling of the nesting septic tank package 10.

With reference to FIGS. 3 and 4, an underground or subsurface sewage disposal system utilizing the nesting septic tank package 10 described above is illustrated after installation and prior to coverage thereof for the disposal of sewage from a source such as a dwelling unit 40. The sewage disposal system includes a septic tank assembly, generally indicated at 50, and an absorption field, generally indicated at 60.

The septic tank assembly 50 comprises a horizontally disposed base means in the form of a subsurface cement slab 42. In installing the nesting septic tank package 10, the cement slab 42 is poured and prior to setting thereof, the elongate septic tanks 11, 12 and 13 are vertically disposed, tandemly arranged, preferably in the order of their diminishing transverse cross-sectional areas with the closed end forming the upper end and mounted as illustrated in FIG. 4 integrally with he cement slab 42 so that the cement slab 42 closes the open end thereof. Thus, upon setting of the cement slab 42, the septic tanks 11, 12 and 13 are securely mounted in a stationary operative relation to one another.

The septic tanks 11, 12 and 13 are then interconnected with conduits 25 to communicate with each other through the diametrically opposed openings 22, previously referred to, and preferably as shown in FIG. 4 in accordance with Federal Housing Authority requirements so that the effective outlets are below the effective inlets in order that sewage will not flow directly from one tank to a successive tank without being processed therein. The conduits 25 are also employed to provide sewage conduits for interconnecting the septic tank 11 of largest transverse cross-sectional area with the dwelling unit 40 for conveying sewage from the dwelling unit 40 to the tandemly arranged septic tanks 11, 12 and 13 for processing thereby. Furthermore, conduits 25 provide sewage conduits for interconnecting the septic tank 13 of smallest transverse cross-sectional area with the absorption field 60 for conveying treated sewage from the tandemly arranged septic tanks to the absorption field 60.

While the absorption field 60 may be in various forms, that illustrated in FIG. 3 is representative of an absorption field and includes interconnected, perforated conduits 25 which are suitably arranged for conveying the treated sewage from a concentrated area to an enlarged or expanded area for passage through the perforations 27 in the conduits 25 and dissipation into the ground adjacent thereto.

Thus, the nesting septic tank package 10 of the present invention is capable of providing a complete sewage disposal system for the disposal of sewage from a source such as that of an individual dwelling unit. The tandem arrangement of the septic tanks 11, 12 and 13 provides a compact package for easy shipment and assembly into a sewage disposal system and provides improved operation of the sewage disposal system in that improved settling efficiency of the sewage is obtained. In this regard, it is preferred, as previously indicated, that the septic tanks 11, 12 and 13 be tandemly arranged in order of their diminishing cross-sectional areas so that the larger capacity septic tanks receive the sewage prior to the smaller capacity septic tanks to allow greater settling in the septic tanks of larger capacity. By this arrangement, the intervals at which any individual septic tank must be cleaned is minimized.

In the drawings and specification there has been set forth a preferred embodiment of the invention and, although specific terms are employed, they are used in a generic and descriptive sense only and not for purposes of limitation.

WHAT IS CLAIMED IS:

1. A nesting septic tank package for assembly in a sewage disposal system characterized by compactness, ease in shipping and ease in assembly, said package comprising a plurality of prefabricated elongate septic tanks open at one end and having successively diminishing cross-sectional areas, said septic tanks being successively and removably positioned one within the other in a nesting package arrangement, and a plurality of conduits positioned within said inner septic tank of smallest cross-sectional area in a nesting package arrangement for use in forming sewage conduits in the disposal system to convey sewage from a source to said tanks, between said tanks and to an absorption field.

2. A nesting septic tank package, as set forth in claim 1, wherein said plurality of elongate septic tanks are cylindrical and are of substantially the same length.

3. A nesting septic tank package, as set forth in claim 1, wherein said septic tanks are prefabricated, sewage impervious, fibrous tubes.

4. A nesting septic tank package, as set forth in claim 1, wherein each of said septic tanks includes diametrically opposed openings therein for forming sewage inlets and outlets in said tanks.

5. A nesting septic tank package, as set forth in claim 1, including means forming closures for the other end of each of said septic tanks and having removable means therein for providing an access to the interior of said tanks.

6. A nesting septic tank system package for assembly into a complete sewage disposal system characterized by compactness, ease in shipping and ease in assembly, said package comprising a plurality of prefabricated elongate septic tanks of generally the same length and being open at one end and having means forming closures for the other ends, said septic tanks having successively diminishing cross-sectional areas and being successively and removably positioned one within the other in a nesting package arrangement, and a sufficient number of conduits positioned within said inner septic tank of smallest cross-sectional area in a nesting package arrangement for use in forming sewage conduits in the disposal system to convey sewage from a source to said tanks, between said tanks, to an absorption field and throughout the absorption field.

7. A nesting septic tank system package, as set forth in claim 6, wherein said septic tanks and said conduits are prefabricated, sewage impervious, cylindrical, fibrous tubes.

* * * * *